US006891288B2

United States Patent
Uemura et al.

(10) Patent No.: US 6,891,288 B2
(45) Date of Patent: May 10, 2005

(54) MAGNETO-GENERATOR, METHOD OF MANUFACTURING THE SAME AND RESIN MOLDING DIE ASSEMBLY FOR MANUFACTURING THE SAME

(75) Inventors: Fumito Uemura, Tokyo (JP); Shinji Baba, Tokyo (JP); Tomokazu Umezaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/690,661

(22) Filed: Oct. 23, 2003

(65) Prior Publication Data

US 2004/0084978 A1 May 6, 2004

Related U.S. Application Data

(62) Division of application No. 09/962,344, filed on Sep. 26, 2001, now abandoned.

(30) Foreign Application Priority Data

Apr. 27, 2001 (JP) ........................................ 2001-132327

(51) Int. Cl.$^7$ ............................................... H02K 1/04
(52) U.S. Cl. ......................................... 310/43; 310/156
(58) Field of Search .................. 310/43, 156; 425/117; 264/275

(56) References Cited

U.S. PATENT DOCUMENTS 4,137,884 A * 2/1979 Odazima et al. ........ 123/149 D
4,423,345 A    12/1983 Nilsson
5,907,206 A *  5/1999 Shiga et al. ........... 310/156.05
6,339,271 B1   1/2002 Noble et al.

FOREIGN PATENT DOCUMENTS

| JP | 6-81437    | 10/1994 | ............ H02K/1/27 |
| JP | 10-032947  | 2/1998  | ............ H02K/1/27 |
| JP | 10-94203   | 4/1998  | ............ H02K/1/27 |
| JP | 2000-78787 | 3/2000  | ............ H02K/1/27 |

* cited by examiner

*Primary Examiner*—Darren Schuberg
*Assistant Examiner*—Nguyen Hanh
(74) *Attorney, Agent, or Firm*—Sughrue Mion, PLLC

(57) ABSTRACT

A magneto-generator, a method of manufacturing the same and a resin molding die for manufacturing the same. In the magneto-generator, a guard ring is omitted with the performance of the magneto-generator being enhanced. The magneto-generator is manufactured by making use of a resin molding die (21) having an outer peripheral surface (21d) to be positioned in opposition to an inner peripheral surface of a flywheel (11) and projections (21a) provided in the outer peripheral surface (21d) for holding a plurality of magnets (12) at predetermined positions, respectively. The magnets (12) are positioned and held stationarily at predetermined positions by the aforementioned projections, respectively, and spaces defined between the resin molding die (21) and the inner peripheral surface of the flywheel (11) are filled with a resin. After hardening of the resin, the resin molding die (21) is detached from the flywheel (11).

10 Claims, 5 Drawing Sheets

MAGNETO-GENERATOR, METHOD OF MANUFACTURING THE SAME AND RESIN MOLDING DIE ASSEMBLY FOR MANUFACTURING THE SAME

CROSS REFERENCE TO RELATED APPLICATION

This is a divisional of application Ser. No. 09/962,344 filed Sep. 26, 2001, now abandoned; the disclosure of which is incorporated herein by reference.

BACKGROUND OF THE INVENTION

1. Field of the Invention

The present invention generally relates to a magneto-generator (also referred to as the magnetoelectric generator) for generating electric power under the action of electromagnetic induction taking place between magnets mounted on a flywheel and an armature winding during rotation of the flywheel and a method of manufacturing the magneto-generator. More particularly, the present invention is concerned with a method of manufacturing a flywheel provided with a plurality of magnets mounted on an inner peripheral surface of the flywheel.

2. Description of Related Art

For having better understanding of the concept underlying the present invention, description will first be made of a conventional flywheel type magneto-generator by reference to FIGS. 6, 7 and 8, in which FIG. 6 is a front view of a rotor of a conventional flywheel type magneto-generator disclosed, for example, in Japanese Patent Publication No. 81437/1994 (JP-A-6-81437), FIG. 7 is a sectional view of the same taken along the line VI—VI shown in FIG. 6 as viewed in the direction indicated by arrows, and FIG. 8 is a perspective view of a guard ring of the conventional flywheel type magneto-generator disclosed in the publication mentioned above. Referring to the figures, reference numeral 1 denotes a flywheel implemented in a substantially bowl-like shape (hereinafter also referred to as the bowl-shaped flywheel only for the convenience of description), reference numeral 2 denotes four magnets mounted on the peripheral wall of the flywheel 1 with equidistance between adjacent ones in the circumferential direction, numeral 3 denotes a guard annulus or ring of a substantially cylindrical shape which is adapted to be closely fit onto the inner surfaces of the magnets 2 which are disposed in a substantially annular array, numeral 4 denotes resin blocks filled at both sides and between the adjacent ones of the magnets 2 for fixedly securing the magnets 2 and the guard ring 3 to the flywheel 1 in a so-called integrated structure, and reference numeral 5 denotes a hub or boss formed in the flywheel 1 at a center portion of the bottom wall for coupling the rotor to a rotatable shaft (not shown).

In the rotor of the conventional magneto-generator implemented in the structure described above, four magnets 2 are disposed with equidistance therebetween on the inner peripheral surface of the flywheel 1 with the guard ring 3 being tightly fit onto the magnets 2 on the inner side thereof, wherein the voids or spaces defined between the inner peripheral surface of the flywheel 1 and the outer peripheral surface of the guard ring 3 are filled with the resin 4. In this manner, the magnets 2 and the guard ring 3 can fixedly be secured to the flywheel 1 through the medium of the resin 4.

FIG. 9 is a perspective view showing another example of the guard ring employed in the conventional magneto-generator. Further, FIG. 10 is a perspective view showing the state in which magnets are disposed on the guard ring shown in FIG. 9. As can easily be seen from FIG. 9, the guard ring 13 shown therein is destined for use in the magneto-generator in which a large number of magnets 2 are employed with the width thereof in the circumferential direction being reduced when compared with the structure shown in FIG. 8. Further, the guard ring 13 shown in FIG. 9 is formed with projections 13a for holding the magnets 2 equidistantly relative to one another.

In the conventional magneto-generator of the structure described above, the positions of the individual magnets 2 are sustained by means of the projections 13a formed in the guard ring 13 until the magnets 2 disposed on the flywheel 1 have been fixedly secured to the flywheel 1. In recent years, however, there has arisen a demand for sparing or omitting the guard ring 3 or 13 with a view to reducing the number of parts constituting the magneto-generator. In this conjunction, it is further noted that the presence of the guard ring 3 or 13 increases the distance between a generator coil of the stator (not shown) and the magnets 2, which is unfavorable for realization of enhanced performance of the magneto-generator. For this reason, the guard ring 3 or 13 should preferably be omitted.

SUMMARY OF THE INVENTION

In the light of the state of the art described above, it is an object of the present invention to provide a magneto-generator of an improved structure which allows the guard ring to be unused or omitted while reducing the manufacturing cost and which can enhance the performance of the magneto-generator by diminishing the distance between the magnets and the generator coil.

Another object of the present invention is to provide a method of manufacturing the magneto-generator of the structure mentioned above.

Yet another object of the present invention is to provide a resin molding die assembly which can be used for manufacturing the above-mentioned magneto-generator.

In view of the above and other objects which will become apparent as the description proceeds, there is provided according to a first aspect of the present invention a magneto-generator which includes a bowl-shaped flywheel, a plurality of magnets mounted on an inner peripheral surface of the flywheel, a resin filled around each of the individual magnets for fixedly securing the magnets to the flywheel as integral parts thereof, and a generator coil disposed within the bowl-shaped flywheel in opposition to the magnets for generating electric power under the action of electromagnetic induction brought about through cooperation with the magnets, wherein the magneto-generator is manufactured by making use of a resin molding die having an outer peripheral surface to be positioned in opposition to an inner peripheral surface of the flywheel and projections provided in the outer peripheral surface for holding the plurality of magnets at predetermined positions, respectively, positioning the magnets at the predetermined positions, respectively, filling the resin in spaces defined between the resin molding die and the flywheel, and detaching the resin molding die from the flywheel.

By virtue of the arrangement described above, there can be implemented the magneto-generator of an improved structure which allows the guard ring is omitted and which thus allows the manufacturing cost to be reduced while ensuring enhanced performance owing to decrease of the distance between the magnets and the generator coil.

Further, there is proposed according to a second aspect of the present invention a method of manufacturing a magneto-generator which includes a bowl-shaped flywheel, a plurality of magnets mounted on an inner peripheral surface of the flywheel, a resin filled around each of the individual magnets for fixedly securing the magnets to the flywheel as integral parts thereof, and a generator coil disposed within the bowl-shaped flywheel in opposition to the magnets for generating electric power under the action of electromagnetic induction brought about through cooperation with the magnets. The manufacturing method includes a resin filling step in which a resin molding die having an outer peripheral surface to be positioned in opposition to an inner peripheral surface of the flywheel and projections provided in the outer peripheral surface for holding the plurality of magnets at predetermined positions, respectively, is employed for filling the resin in spaces defined between the resin molding die and the flywheel while holding the magnets at the predetermined positions, respectively, and a die detaching step of detaching the resin molding die from the flywheel.

Owing to the features described above, the guard ring can be omitted from the magneto-generator and hence the manufacturing cost of the magneto-generator can be reduced while the performance of the generator can be enhanced owing to the shortened distance intervening between the magnets and the generator coil of the magneto-generator.

In a preferred mode for carrying out the method described above, each of the projections of the resin molding die should be so provided as to extend continuously and axially from a given position at a side of the magnet substantially up to an open end of the flywheel.

With the arrangement described above, the magnets can securely be sustained in the circumferential direction, and the magnets can be held stationarily in a stabilized manner without incurring undesirable rotation or displacement of the magnets. Thus, the manufacturing efficiency can significantly be enhanced.

In another preferred mode for carrying out the method described above, the resin molding die may include a magnet sucking/holding mechanism disposed interiorly of the die for securing fixedly the magnets on the outer peripheral surface of the resin molding die upon filling of the resin.

With the arrangement described above, the magnets can be held stationarily in a much stabilized state. Thus, the manufacturing efficiency can further be enhanced.

Furthermore, there is proposed according to a third aspect of the present invention a resin molding die for manufacturing a magneto-generator which is comprised of a bowl-shaped flywheel, a plurality of magnets mounted on an inner peripheral surface of the flywheel, a resin filled around each of the individual magnets for fixedly securing the magnets to the flywheel as integral parts thereof, and a generator coil disposed within the bowl-shaped flywheel in opposition to the magnets for generating electric power under the action of electromagnetic induction brought about through cooperation with the magnets. The resin molding die includes an outer peripheral surface to be positioned in opposition to an inner peripheral surface of the flywheel, and projections provided in the outer peripheral surface for holding the plurality of magnets at predetermined positions, respectively.

Owing to the arrangement of the resin molding die assembly described above, the guard ring can be omitted from the magneto-generator and hence the manufacturing cost of the magneto-generator can be reduced. Moreover, the performance of the magneto-generator can be enhanced owing to the decreased distance intervening between the magnets and the generator coil of the magneto-generator.

In a mode for carrying out the invention, each of the projections should preferably extend continuously and axially from a given position at a side of the magnet substantially up to an open end of the flywheel.

With the arrangement described above, the magnets can steadily be held in the circumferential direction without incurring rotation or the like displacement of the magnets. Thus, the magnets can be held in a much stabilized state, which in turn means that the manufacturing efficiency of the magneto-generator can correspondingly be enhanced.

In another mode for carrying out the invention, the resin molding die should preferably include a magnet sucking/holding mechanism disposed interiorly of the die for securing fixedly the magnets on the outer peripheral surface of the resin molding die upon filling of the resin.

With the arrangement described above, the magnets can be held more positively, whereby the manufacturing efficiency can significantly be increased.

In yet another mode for carrying out the invention, the resin molding die for manufacturing the magneto-generator may further include a ring-like projection formed around the outer peripheral surface of the die for supporting the magnets at one end thereof.

In still another mode for carrying out the invention, the resin molding die for manufacturing the may further include a plurality of discrete projections disposed around the outer peripheral surface of the die for supporting the plurality-of magnets at one ends thereof, respectively.

In a further mode for carrying out the invention, the resin molding die may be so designed as to cooperate with an outside molding die disposed around the resin molding die for supporting an open end of the flywheel.

The arrangements mentioned above contribute to holding stationarily the magnets at respective predetermined positions with high reliability during the resin molding process.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
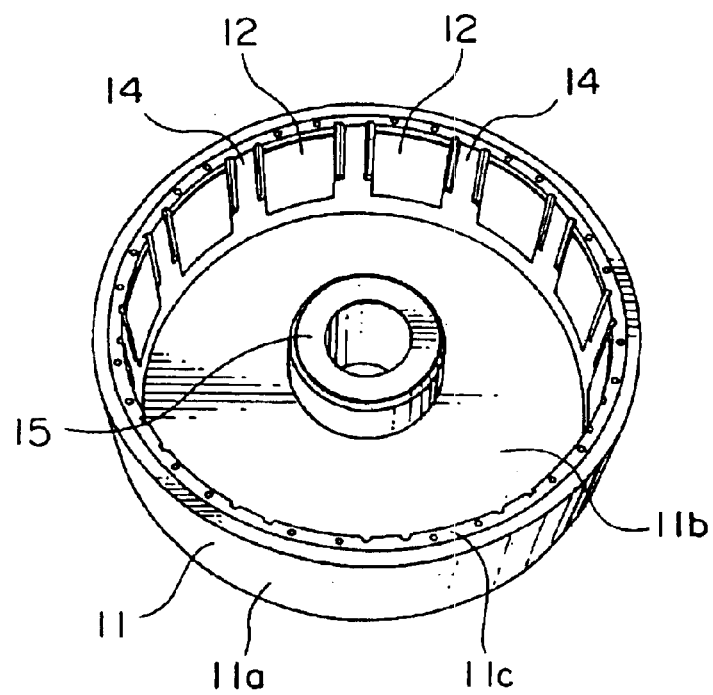
FIG. 1 is a perspective view showing a rotor of a magneto-generator according to an embodiment of the present invention.

The present invention will be described in detail in conjunction with what is presently considered as preferred or typical embodiments thereof by reference to the drawings. In the following description, like reference characters designate like or corresponding parts throughout the several views.

FIG. 1 is a perspective view showing a rotor of a magneto-generator according to an embodiment of the present invention. Referring to FIG. 1, the rotor of the magneto-generator according to the instant-embodiment of the invention includes a bowl-shaped flywheel 11 which is composed of a cylindrical peripheral wall 11a and a bottom portion 11b formed integrally with the cylindrical peripheral wall 11a so as to close one open end of the cylindrical peripheral wall 11a. Formed at a center of the bottom portion 11b of the flywheel 11 is a hub or boss 15 which is employed for coupling the rotor to a rotatable shaft such as e.g. a crank shaft of an internal combustion engine (not shown). Further, twelve magnets 12 each having an arcuate cross-section are disposed on the inner peripheral surface of the cylindrical peripheral wall 11a of the flywheel 11 equidistantly relative to one another as viewed in the circumferential direction. Resin 14 is filled in the spaces formed between the individual magnets 12 and at both sides thereof so that the magnets 12 are embedded flush in the resin 14, whereby the magnets 12 are fixedly secured at respective predetermined positions in the axial direction as well as in the radial direction.

Figure 2:
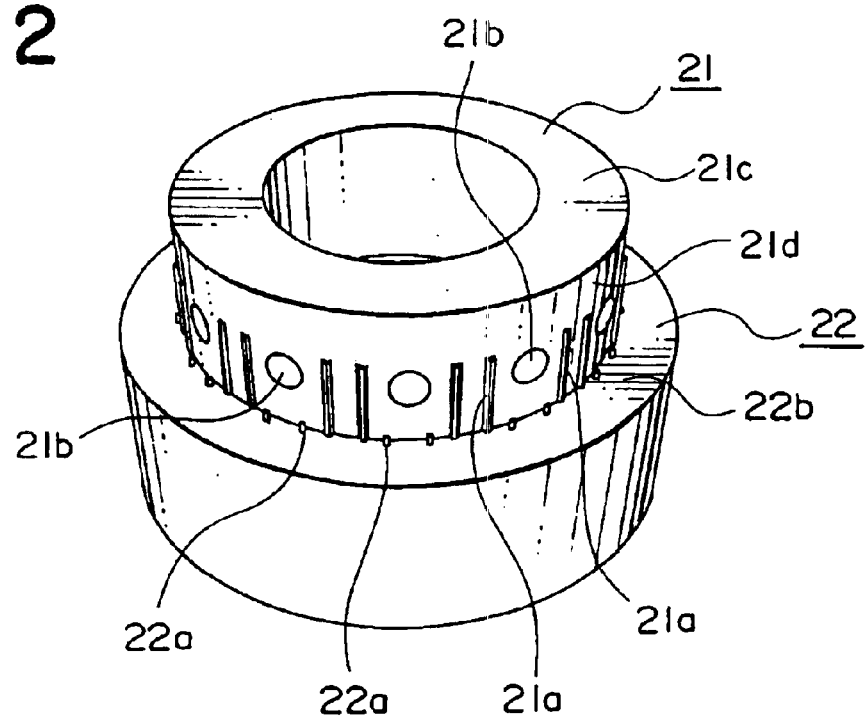
FIG. 2 is a perspective view showing a resin molding die assembly which can be employed for manufacturing the rotor shown in FIG. 1.
Figure 3:
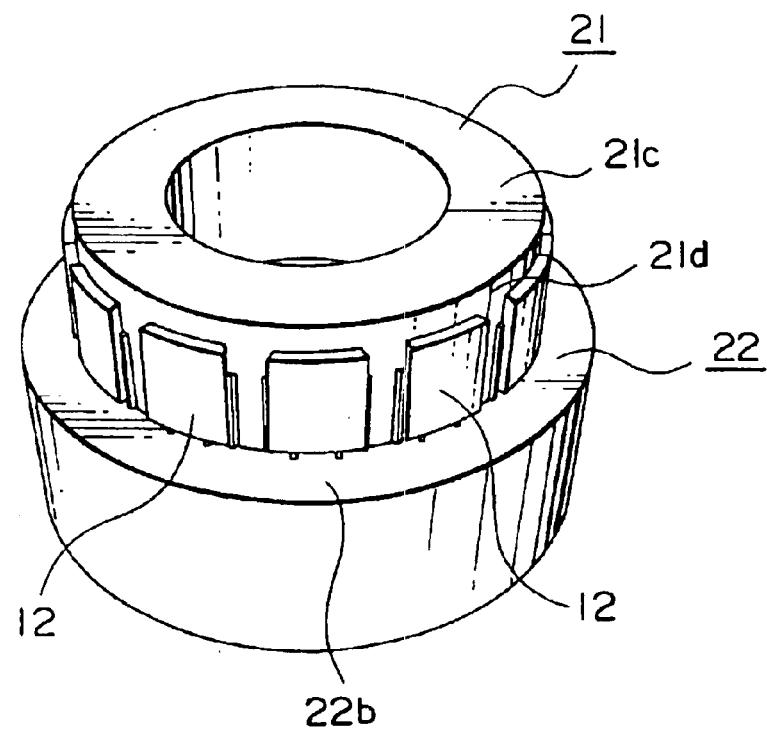
FIG. 3 is a view showing the state in which magnets are magnetically attracted stationarily onto a resin molding die assembly.

FIG. 2 is a perspective view showing a resin molding die assembly which can be employed for manufacturing the rotor shown in FIG. 1. The resin molding die assembly according to the instant embodiment of the invention is generally comprised of two major portions, i.e., a rotor inside molding die 21 and a rotor outside molding die 22. Provided in the outer peripheral surface of the rotor inside molding die 21 are projections 21a for sustaining or holding the magnets 12 in the circumferential direction while projections 22a for holding the magnets 12 in the axial direction are provided in the rotor outside molding die 22. Each of the projections 21a extends continuously in the axial direction from a given position at a side of the magnet (not shown) substantially up to the open end of the bowl-shaped flywheel 11. Further, through-holes 21b for sucking and holding fixedly the magnets 12 are formed in the rotor inside molding die 21 at positions where the magnets 12 are to be positioned. To this end, a magnet sucking/holding mechanism (not shown) is disposed in the interior of the rotor inside molding die 21 for sucking and holding stationarily the magnets 12 by making use of e.g. a negative pressure or vacuum. By way of example, the magnet sucking/holding mechanism mentioned above may be constituted by suction or vacuum nozzle devices connected hydraulically to a vacuum source such as a vacuum pump for sucking the magnets 12 under vacuum by way of the through-holes 21b to thereby hold stationarily the magnets at respective positions. Alternatively, the magnet sucking/holding mechanism may be constituted by a magnetic holding device or the like which is designed to magnetically attract the magnets 12 for thereby holding them stationarily at respective positions under magnetic attracting force. In FIG. 3, there is shown the state in which the magnets 12 are fixedly disposed in the resin molding die assembly under vacuum or magnetic attraction.

The flywheel rotor is manufactured by making use of the resin molding die assembly implemented in the structure described above in the manner described below. The flywheel to be mounted with magnets, the rotor inside molding die 21 and the rotor outside molding die 22 are mutually superposed such that an end face 21c of the rotor inside molding die 21 is brought into contact with the bottom portion 11b of the flywheel 11, an outer peripheral surface 21d of the rotor inside molding die 21 is disposed in opposition to the inner peripheral surface of the flywheel 11, and an end face 22b of the rotor outside molding die 22 bears on the opening edge portion 11c of the flywheel 11, whereby spaces to be filled with resin are formed, respectively. These spaces are then filled with the resin 14. Thus, the magnets 12 are fixedly secured at predetermined positions, respectively, after the resin has been hardened. Subsequently, the resin molding dies are detached from the flywheel 11.

Figure 4:
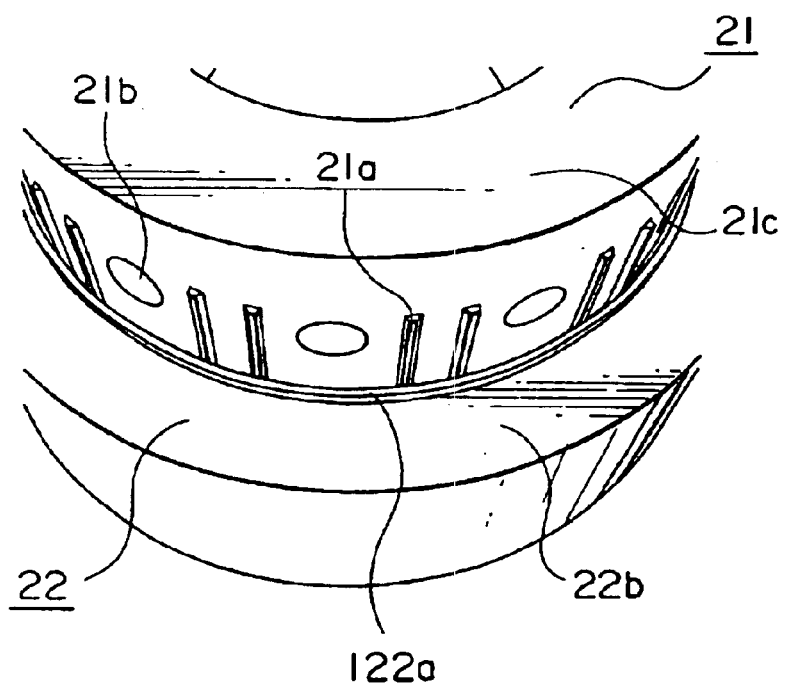
FIG. 4 is a perspective view showing another example of the resin molding die assembly.

FIG. 4 is a perspective view which shows another example of the resin molding die assembly. In the case of this resin molding die assembly, the projection provided in the rotor outside molding die 22 for holding stationarily the magnets in the axial direction is formed in an annular or ring shape such as exemplified by a ring-like projection 122a.

Figure 5:
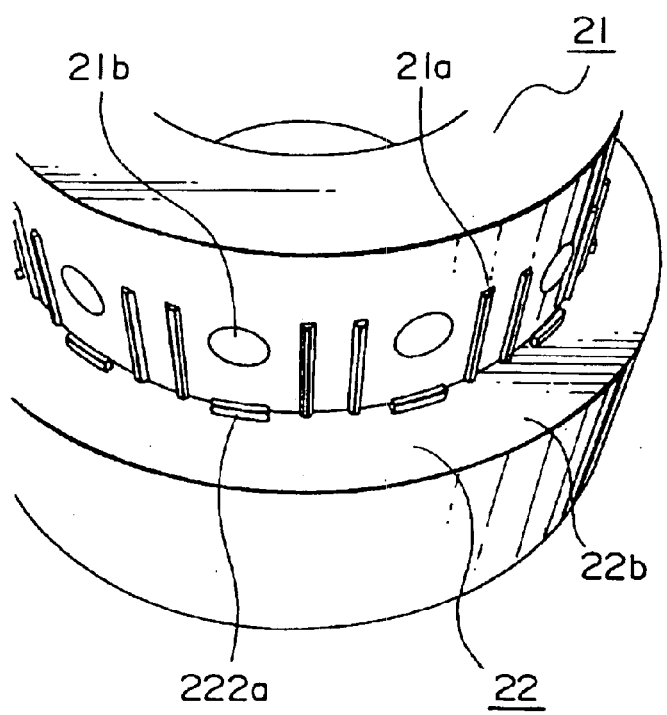
FIG. 5 is a perspective view showing yet another example of the resin molding die assembly.
Figure 6:
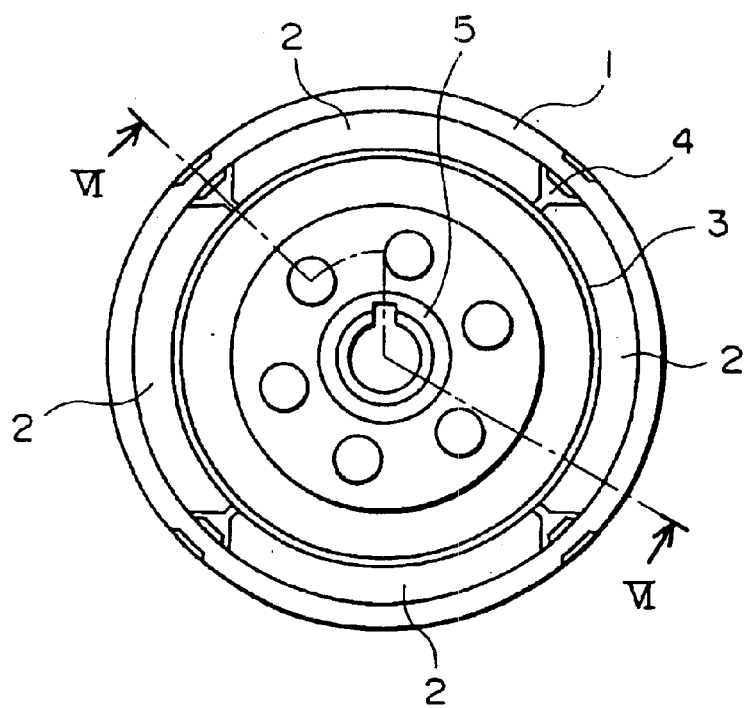
FIG. 6 is a front view of a rotor of a conventional flywheel type magneto-generator.
Figure 7:
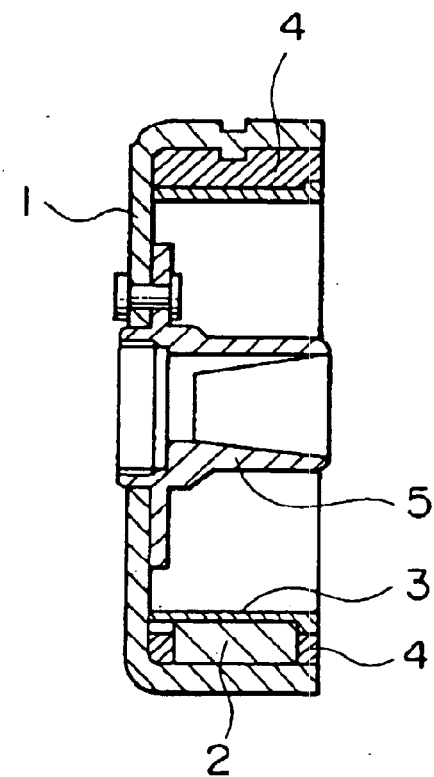
FIG. 7 is a sectional view of the same taken along the line VI—VI shown in FIG. 6 and viewed in the direction indicated by arrows.
Figure 8:
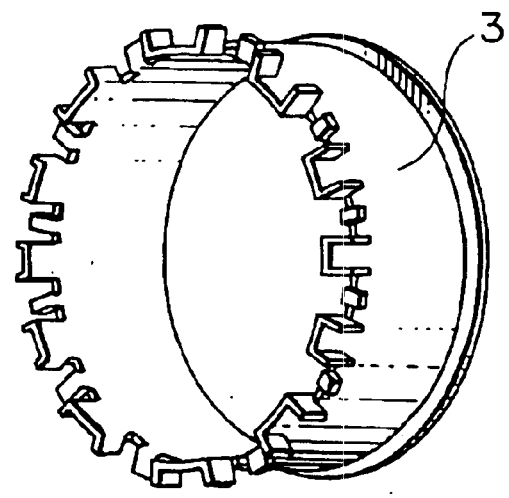
FIG. 8 is a perspective view showing a guard ring employed in the conventional flywheel type magneto-generator.
Figure 9:
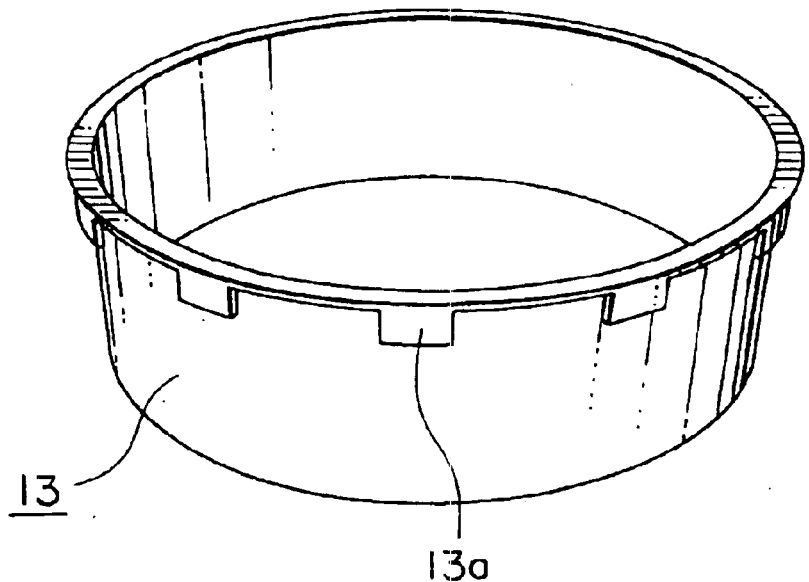
FIG. 9 is a perspective view showing another example of the guard ring employed in the conventional magneto-generator.
Figure 10:
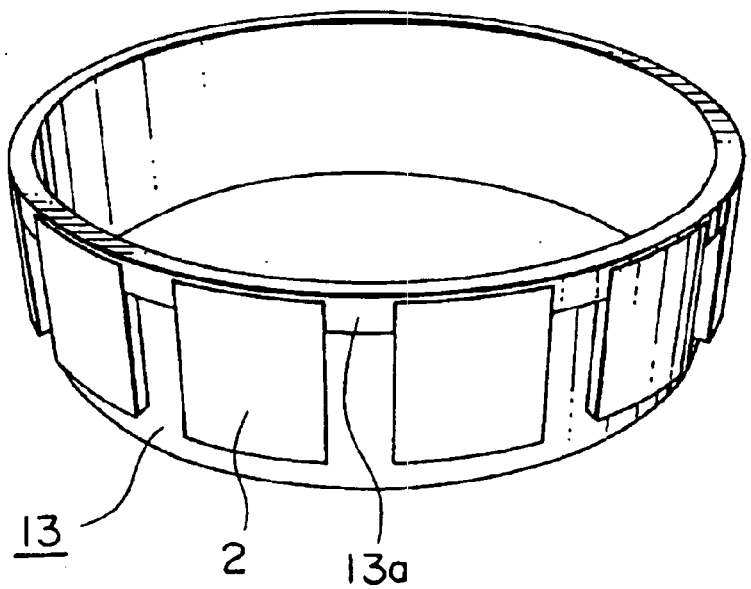
FIG. 10 is a perspective view showing the state in which magnets are disposed on the guard ring shown in FIG. 9.

FIG. 5 is a perspective view which shows yet another example of the resin molding die assembly. In the case of this resin molding die assembly, projections provided in the rotor outside molding die 22 for holding the magnets in the axial direction are each formed in an arcuate shape, as exemplified by the projections 222a.

In the magneto-generator implemented in the structure described above, the magneto-generator includes the bowl-shaped flywheel 11, a plurality of magnets 12 mounted on an inner peripheral surface of the flywheel 11, the resin 14 filled around each of the individual magnets 12 for fixedly securing the magnets 12 to the flywheel 11 as integral parts thereof, and a generator coil disposed within the bowl-shaped flywheel 11 in opposition to the magnets 12 for generating electric power under the action of electromagnetic induction brought about through cooperation with the magnets 12. The magneto-generator is manufactured by making use of the resin molding die 21 having the outer peripheral surface 21d to be positioned in opposition to the inner peripheral surface of the flywheel 11 and projections 21a provided in the outer peripheral surface 21d for holding the plurality of magnets 12 at predetermined positions, respectively, positioning the magnets 12 at the predetermined positions, respectively, filling the resin 14 in spaces defined between the resin molding die 21 and the flywheel 11, and detaching the resin molding die 21 from the flywheel 11 after the resin has been hardened. By virtue of the arrangement described above, there can be manufactured the magneto-generator of an improved structure which allows the guard ring usually employed in this type conventional magneto-generator to be omitted and hence the manufacturing cost to be reduced. In addition, the performance of the magneto-generator can significantly be enhanced because the distance between the magnets and the generator coil is shortened owing to the absence of the guard ring.

Further, the method of manufacturing the magneto-generator according to the instant embodiment of the invention includes the resin filling step in which the resin molding die 21 having an outer peripheral surface 21d to be positioned in opposition to the inner peripheral surface of the flywheel 11 and the projections 21a provided in the outer peripheral surface 21d for holding the plurality of magnets 12 at predetermined positions, respectively, is employed for filling the resin 14 in the spaces defined between the resin molding die 21 and the flywheel 11 while holding the magnets 12 at the predetermined positions, respectively, and the die detaching step of detaching the resin molding die 21 from the flywheel 11. Owing to the features described above, the guard ring usually employed in this type conventional magneto-generator can be omitted in the magneto-generator according to the present invention and thus the manufacturing cost thereof can be reduced while the performance of the magneto-generator can be enhanced because the distance intervening between the magnets and the generator coil of the magneto-generator is diminished owing to the omission of the guard ring.

Many modifications and variations of the present invention are possible in the light of the above techniques. It is therefore to be understood that within the scope of the appended claims, the invention may be practiced otherwise than as specifically described.

What is claimed is:

1. A combination of a magneto-generator rotor and a resin molding die, wherein:

said magneto-generator rotor comprises a bowl-shaped flywheel, a plurality of magnets mounted on an inner peripheral surface of said flywheel, and resin filled around each of said magnets for fixedly securing said magnets to said flywheel; and said resin molding die comprises an outer peripheral surface positioned in opposition to the inner peripheral surface of said flywheel, and projections provided in said outer peripheral surface abutting against and retaining said plurality of magnets in a circumferential direction.

2. A combination of a magneto-generator rotor and a resin molding die according to claim 1, wherein said plurality of magnets have arcuate cross sections.

3. A combination of a magneto-generator rotor and a resin molding die according to claim 1, wherein radially innermost surfaces of the magnets are flush with radially innermost surfaces of the resin.

4. A combination of a magneto-generator rotor and a resin molding die according to claim 1, wherein the resin extends around circumferential sides, tops and bottoms of each of the magnets.

5. A combination of a magneto-generator rotor and a resin molding die according to claim 1, wherein a radial thickness of the resin is equivalent to a radial thickness of the portion of the bowl shaped flywheel whereupon the magnets are mounted.

6. A combination of a magneto-generator rotor and a resin molding die according to claim 1, wherein radially innermost surfaces of the resin comprise indentations formed by the projections of the resin molding die.

7. A combination of a magneto-generator rotor and a resin molding die according to claim 6, wherein the indentations comprise grooves extending axially along circumferential sides of the magnets.

8. A combination of a magneto-generator rotor and a resin molding die according to claim 1, wherein axially outermost surfaces of the resin comprise indentations formed by the projections of the molding die.

9. A combination of a magneto-generator rotor and a resin molding die according to claim 8, wherein the indentations comprise holes extending perpendicularly from axially upper surfaces of the magnets.

10. A combination of a magneto-generator rotor and a resin molding die according to claim 1, wherein:

the bowl shaped flywheel comprises a bottom portion and a cylindrical peripheral wall whereupon the magnets are mounted; and the magnets do not extend axially beyond the peripheral wall.

* * * * *